(12) United States Patent  
Suzuki

(10) Patent No.: US 9,972,078 B2  
(45) Date of Patent: May 15, 2018

(54) IMAGE PROCESSING APPARATUS

(71) Applicant: CANON KABUSHIKI KAISHA, Tokyo (JP)

(72) Inventor: Yasuo Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/234,418

(22) Filed: Aug. 11, 2016

(65) Prior Publication Data

US 2017/0061594 A1    Mar. 2, 2017

(30) Foreign Application Priority Data

Aug. 24, 2015   (JP) .................. 2015-164844

(51) Int. Cl.
```
G06K 9/00      (2006.01)
G06T 5/00      (2006.01)
G09G 3/34      (2006.01)
H04N 1/60      (2006.01)
H04N 9/67      (2006.01)
```
(52) U.S. Cl.
CPC ........... *G06T 5/009* (2013.01); *G09G 3/3426* (2013.01); *H04N 1/6058* (2013.01); *H04N 9/67* (2013.01); *G09G 2320/0646* (2013.01); *G09G 2360/16* (2013.01)

(58) Field of Classification Search
CPC ...... H04N 1/6058; H04N 1/6066; H04N 9/68; H04N 9/3182; H04N 9/69; H04N 5/202; G06K 15/1878  
See application file for complete search history.

(56) References Cited

U.S. PATENT DOCUMENTS 6,373,595 B1 * 4/2002 Semba .................. G06T 11/001  
　　　　　　　　　　　　　　　　　　345/589  
6,611,356 B1 * 8/2003 Shimizu ............... H04N 1/6058  
　　　　　　　　　　　　　　　　　　358/1.9

(Continued)

FOREIGN PATENT DOCUMENTS

EP    2 071 823 A2    6/2009  
JP    09-098298 A     4/1997

OTHER PUBLICATIONS

Chae-Soo Lee et al—Gamut Mapping Algorithm Using Lightness Mapping and Multiple Anchor Points for Linear Tone and Maximum Chroma Reproduction, Journal of Imaging Science and Technology, vol. 45, No. 3, pp. 209-223, Jun. 1, 2001.

(Continued)

*Primary Examiner* — Eueng-Nan Yeh  
(74) *Attorney, Agent, or Firm* — Cowan, Liebowitz & Latman, P.C.

(57) ABSTRACT

An image processing apparatus includes: an acquisition unit that acquires image data represented by a color included in a first color gamut; and a conversion unit configured to convert colors of pixels of the image data into colors included in a second color gamut, wherein the conversion unit converts the color of the pixel, a brightness of which is included in a first brightness range, of the image data by a first conversion process, and converts the color of the pixel, the brightness of which is included in a second brightness range different from the first brightness range, of the first image data by a second conversion process.

30 Claims, 12 Drawing Sheets

(56) References Cited

U.S. PATENT DOCUMENTS

| | | | | |
|---|---|---|---|---|
| 7,136,187 B1 * | 11/2006 | Ohkubo | ............... | H04N 1/6033 348/E9.047 |
| 8,542,246 B2 * | 9/2013 | Saigo | ................... | G06T 11/001 345/590 |
| 2007/0188783 A1 | 8/2007 | Hasegawa | | |
| 2009/0310157 A1 | 12/2009 | Wada | | |

OTHER PUBLICATIONS

European Search Report dated Jan. 5, 2017, that issued in the corresponding European Patent Application No. 16 18 2923.9.

\* cited by examiner

FIG. 4

| | SELECTION SIGNAL=0 | SELECTION SIGNAL=1 | SELECTION SIGNAL=2 |
|---|---|---|---|
| L* > MAXIMUM-COLOR SATURATION BRIGHTNESS VALUE | FIRST CONVERSION DATA (CD1) | $\alpha \times CD1 + (1-\alpha) \times CD2$ | SECOND CONVERSION DATA (CD2) |
| L* ≦ MAXIMUM-COLOR SATURATION BRIGHTNESS VALUE | SECOND CONVERSION DATA (CD2) | $(1-\alpha) \times CD1 + \alpha \times CD2$ | FIRST CONVERSION DATA (CD1) |

DATA AFTER COLOR GAMUT CONVERSION PROCESS

LIGHT-EMITTING AREA

LIGHT-EMITTING AREA

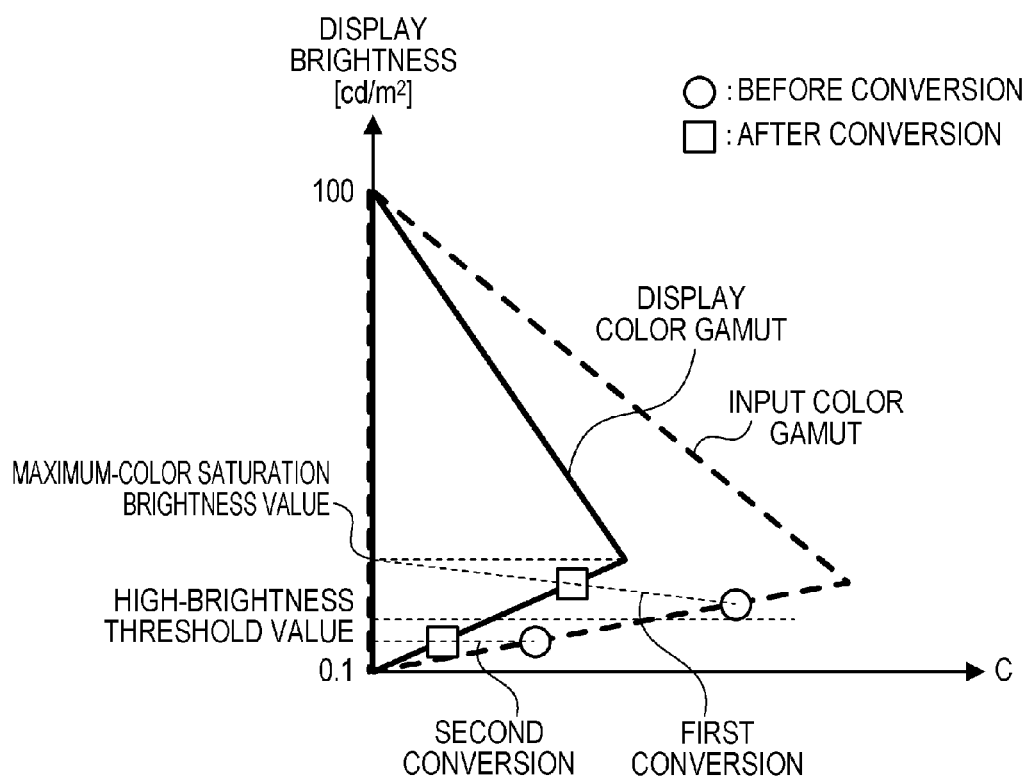

FIG. 11

| | | SELECTION SIGNAL =0 | SELECTION SIGNAL =1 | SELECTION SIGNAL =2 |
|---|---|---|---|---|
| L* > MAXIMUM-COLOR SATURATION BRIGHTNESS VALUE | DISPLAY BRIGHTNESS > HIGH-BRIGHTNESS THRESHOLD VALUE | FIRST CONVERSION DATA (CD1) | FIRST CONVERSION DATA (CD1) | FIRST CONVERSION DATA (CD1) |
| L* > MAXIMUM-COLOR SATURATION BRIGHTNESS VALUE | DISPLAY BRIGHTNESS ≦ HIGH-BRIGHTNESS THRESHOLD VALUE | FIRST CONVERSION DATA (CD1) | $\alpha \times CD1 + (1-\alpha) \times CD2$ | SECOND CONVERSION DATA (CD2) |
| L* ≦ MAXIMUM-COLOR SATURATION BRIGHTNESS VALUE | DISPLAY BRIGHTNESS < HIGH-BRIGHTNESS THRESHOLD VALUE | SECOND CONVERSION DATA (CD2) | SECOND CONVERSION DATA (CD2) | SECOND CONVERSION DATA (CD2) |
| L* ≦ MAXIMUM-COLOR SATURATION BRIGHTNESS VALUE | DISPLAY BRIGHTNESS ≧ HIGH-BRIGHTNESS THRESHOLD VALUE | SECOND CONVERSION DATA (CD2) | $(1-\alpha) \times CD1 + \alpha \times CD2$ | FIRST CONVERSION DATA (CD1) |

DATA AFTER COLOR GAMUT CONVERSION PROCESS

IMAGE PROCESSING APPARATUS

BACKGROUND OF THE INVENTION

Field of the Invention

The present invention relates to an image processing apparatus.

Description of the Related Art

Opportunities of handling image data having a wide color gamut are expanded. The image data having the wide color gamut is referred to as "wide-color-gamut image data". For example, there is a photographing apparatus capable of generating the wide-color-gamut image data by photographing. The wide-color-gamut image data has the color gamut defined by, e.g., Rec. 2020. Conventionally, the color gamut defined by Rec. 709 has been used in an image generation field. The color gamut defined by Rec. 709 is narrower than the color gamut defined by Rec. 2020. However, in the future, a wider color gamut is considered to be used also in the image generation field. For example, the color gamut defined by Rec. 2020 is considered to be used. However, although the display performance of an image display apparatus is improved, there is almost no image display apparatus capable of displaying all colors that can be handled by the photographing apparatus. For example, the color gamut of the color that can be displayed by the image display apparatus corresponds to about 60 to 80% of the color gamut defined by Rec. 2020.

To cope with this, there is proposed a technique for converting the color gamut of image data into the color gamut that can be displayed by the image display apparatus while maintaining the hue of the image data.

For example, in a color gamut compression apparatus described in Japanese Patent Application Laid-open No. H9-98298, a pixel value is converted such that a brightness value (luminance value) L* is decreased in the case where the brightness value L* of a pixel of image data before conversion is larger than a predetermined value, and the pixel value is converted such that the brightness value L* is increased in the case where the brightness value L* thereof is smaller than the predetermined value.

SUMMARY OF THE INVENTION

The present invention in its first aspect provides an image processing apparatus comprising:

an acquisition unit configured to acquire first image data represented by a color included in a first color gamut; and a conversion unit configured to convert colors of pixels of the first image data into colors included in a second color gamut by changing at least a color saturation to thereby generate second image data represented by colors included in the second color gamut, wherein the conversion unit converts the color of the pixel of the first image data by at least one of a first conversion process in which the color is converted such that a brightness of the color after the conversion approaches a target brightness and a second conversion process in which the color is converted such that the brightness does not change, and wherein the conversion unit converts the color of the pixel, the brightness of which is included in a first brightness range, of the first image data by the first conversion process, and converts the color of the pixel, the brightness of which is included in a second brightness range different from the first brightness range, of the first image data by the second conversion process.

The present invention in its second aspect provides an image processing method comprising:

an acquisition step of acquiring first image data represented by a color included in a first color gamut; and a conversion step of converting colors of pixels of the first image data into colors included in a second color gamut by changing at least color saturation to thereby generate second image data represented by colors included in the second color gamut, wherein in the conversion step, the color of the pixel of the first image data is converted by at least one of a first conversion process in which the color is converted such that a brightness of the color after the conversion approaches a target brightness and a second conversion process in which the color is converted such that the brightness does not change, and wherein in the conversion step, the color of the pixel, a brightness of which is included in a first brightness range, of the first image data is converted by the first conversion process, and the color of the pixel, a brightness of which is included in a second brightness range different from the first brightness range, of the first image data is converted by the second conversion process.

The present invention in its third aspect provides a non-transitory computer readable medium that stores a program, wherein the program causes a computer to execute an acquisition step of acquiring first image data represented by a color included in a first color gamut; and a conversion step of converting colors of pixels of the first image data into colors included in a second color gamut by changing at least color saturation to thereby generate second image data represented by colors included in the second color gamut, wherein in the conversion step, the color of the pixel of the first image data is converted by at least one of a first conversion process in which the color is converted such that a brightness of the color after the conversion approaches a target brightness and a second conversion process in which the color is converted such that the brightness does not change, and wherein in the conversion step, the color of the pixel, a brightness of which is included in a first brightness range, of the first image data is converted by the first conversion process, and the color of the pixel, a brightness of which is included in a second brightness range different from the first brightness range, of the first image data is converted by the second conversion process.

Further features of the present invention will become apparent from the following description of exemplary embodiments with reference to the attached drawings.

BRIEF DESCRIPTION OF THE DRAWINGS

FIG. 4 is a view showing an example of the color gamut conversion process according to Embodiment 2;

FIG. 10 is a view showing an example of the exceptional process according to Embodiment 3;

FIG. 11 is a view showing an example of the color gamut conversion process according to Embodiment 3;

DESCRIPTION OF THE EMBODIMENTS

Embodiment 1

Hereinbelow, an image processing apparatus according to Embodiment 1 of the present invention will be described. In the following description, an example in which the image processing apparatus according to the present embodiment is provided in an image display apparatus will be described, but the image processing apparatus according to the present embodiment may be the apparatus separate from the image display apparatus.

Figure 1:
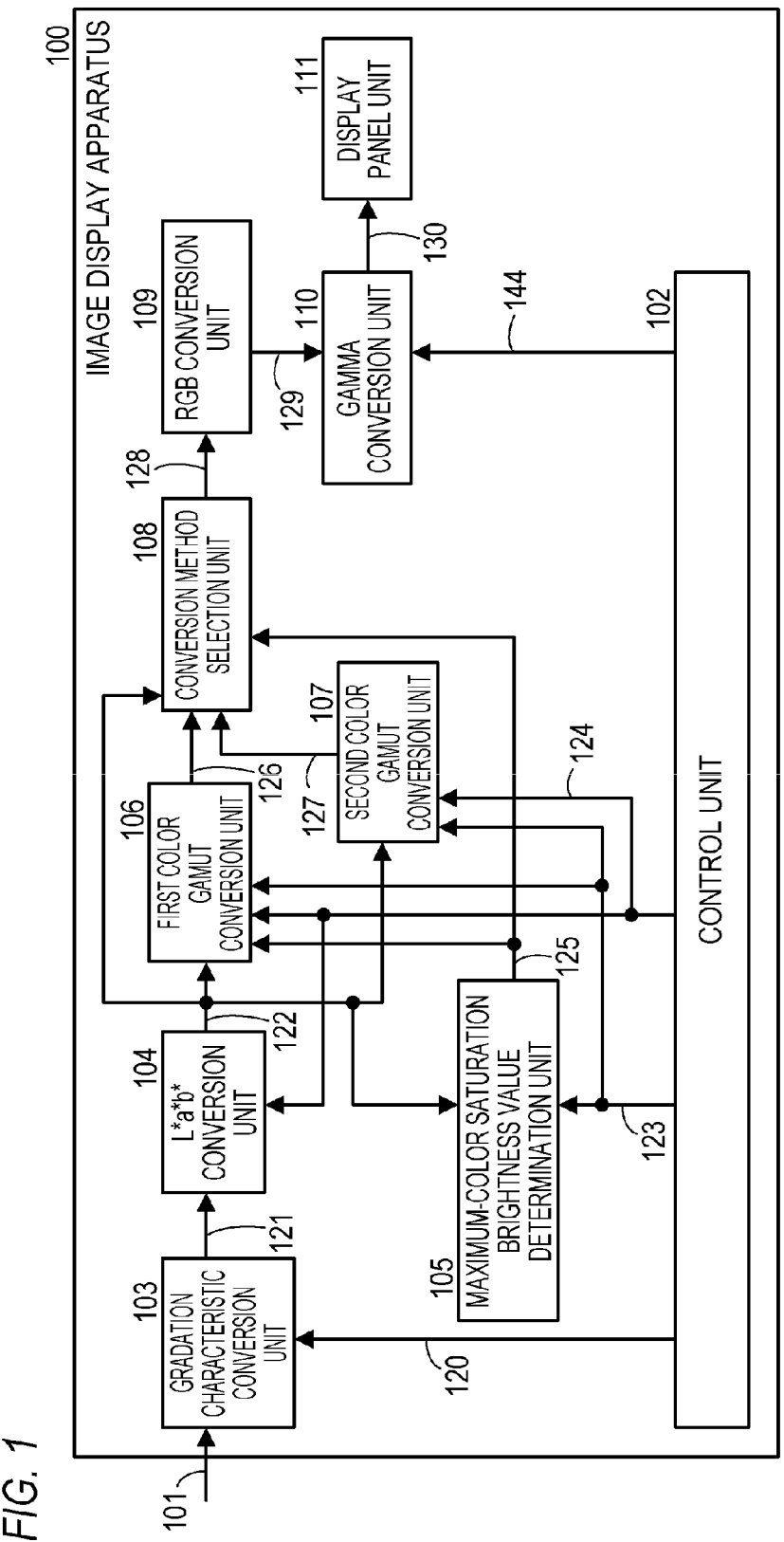
FIG. 1 is a block diagram showing an example of the functional configuration of an image display apparatus according to Embodiment 1.

FIG. 1 is a block diagram showing an example of the functional configuration of an image display apparatus 100 according to the present embodiment. As shown in FIG. 1, the image display apparatus 100 has a control unit 102, a gradation characteristic conversion unit 103, an L*a*b* conversion unit 104, a maximum-color saturation brightness value determination unit 105, a first color gamut conversion unit 106, a second color gamut conversion unit 107, a conversion method selection unit 108, an RGB conversion unit 109, a gamma conversion unit 110, and a display panel unit 111.

Input image data 101 is inputted to the image display apparatus 100. The color gamut of the input image data 101 is not particularly limited and, in the present embodiment, the color gamut of the input image data 101 is the color gamut wider than a common color gamut. Image data having the common color gamut can be referred to as "common-color-gamut image data", and image data having the color gamut wider than the common color gamut can be referred to as "wide-color-gamut image data". The common color gamut is the color gamut defined by, e.g., Rec. 709. The color gamut wider than the common color gamut is the color gamut defined by, e.g., Rec. 2020.

The gradation characteristic of the input image data 101 is not particularly limited and, in the present embodiment, image data having a nonlinear characteristic is acquired as the input image data 101. The nonlinear characteristic is the gradation characteristic in which brightness nonlinearly increases with an increase in gradation value. Specifically, image data obtained by performing a gamma conversion process on image data generated by photographing by a photographing apparatus is acquired as the input image data 101. The method for acquiring the input image data 101 is not particularly limited and, in the present embodiment, the input image data 101 is inputted to the image display apparatus 100 by serial digital interface (SDI) transmission.

The data format of the input image data is not particularly limited and, in the present embodiment, image data having a 10-bit RGB value (a 10-bit R value, a 10-bit G value, and a 10-bit B value) as a pixel value is acquired as the input image data 101.

The control unit 102 controls processes of the individual function units of the image display apparatus 100. In the present embodiment, the control unit 102 sets parameters such as conversion characteristic curve information 120, display color gamut information 123, and input color gamut information 124. The conversion characteristic curve information 120 is the parameter (a function, a table, or the like) indicative of the correspondence between the gradation value before conversion by the gradation characteristic conversion unit 103 and the gradation value after the conversion by the gradation characteristic conversion unit 103. In the present embodiment, a color gamut conversion process in which the color gamut of the image data is converted from a first color gamut to a second color gamut is performed. The input color gamut information 124 is the parameter indicative of the first color gamut. The first color gamut is not particularly limited and, in the present embodiment, the first color gamut is the color gamut (input color gamut) of the input image data 101. The display color gamut information 123 is the parameter indicative of the second color gamut. The second color gamut is not particularly limited and, in the present embodiment, the second color gamut is the color gamut (display color gamut) that can be displayed in the display panel unit 111. In addition, the magnitude relationship between the display color gamut (the second color gamut) and the input color gamut (the first color gamut) is not particularly limited and, in the present embodiment, the display color gamut is narrower than the input color gamut.

The control unit 102, for example, reads initial values of the parameters from a non-volatile memory (not shown) when the image display apparatus 100 is started, and sets the read parameters. The control unit 102 is capable of changing the set parameter in response to a user operation and changing the set parameter based on external data (data acquired from the outside). For example, there are cases where metadata of the input image data 101 includes data related to the conversion characteristic curve information 120 or the input color gamut information 124. In these cases, the conversion characteristic curve information 120 or the input color gamut information 124 may be acquired by analyzing the metadata, and the acquired conversion characteristic curve information 120 or input color gamut information 124 may be set. In addition, in the case where the image processing apparatus according to the present embodiment is the apparatus separate from the image display apparatus, the display color gamut information 123 may be acquired from the image display apparatus and set.

The gradation characteristic conversion unit 103 generates linear characteristic data 121 by acquiring the input image data 101 and converting the gradation characteristic of the input image data 101 into the linear characteristic. The linear characteristic is the gradation characteristic in which the brightness linearly increases with an increase in gradation value. Specifically, the gradation characteristic conversion unit 103 generates the linear characteristic data 121 by converting each gradation value of the input image data 101 in accordance with the set conversion characteristic curve information 120. The conversion characteristic curve information 120, for example, indicates the inverse of the conversion characteristic of the gamma conversion process performed when the input image data 101 is generated. The data format of the linear characteristic data 121 is not particularly limited and, in the present embodiment, image data having a 14-bit RGB value (a 14-bit R value, a 14-bit G value, and a 14-bit B value) as the pixel value is generated as the linear characteristic data 121. The gradation characteristic conversion unit 103 outputs the generated linear characteristic data 121 to the L*a*b* conversion unit 104.

The L*a*b* conversion unit 104 converts each pixel value (the RGB value) of the linear characteristic data 121 into an L*a*b* color space value based on the input color gamut information 124. With this, L*a*b* data 122 is generated. An L* value included in the L*a*b* color space value is the brightness value (luminance value), and an a* value and a b* value included in the L*a*b* color space value are color difference values. The L*a*b* conversion unit 104 outputs the generated L*a*b* data 122 to the maximum-color saturation brightness value determination unit 105, the first color gamut conversion unit 106, the second color gamut conversion unit 107, and the conversion method selection unit 108.

The maximum-color saturation brightness value determination unit 105 determines a hue angle (hue) for each pixel of the L*a*b* data 122. Subsequently, the maximum-color saturation brightness value determination unit 105 determines a maximum-color saturation brightness value 125 for each pixel of the L*a*b* data 122 based on the hue angle of the pixel and the set display color gamut information 123. The maximum-color saturation brightness value 125 is the brightness value that maximizes a color saturation value C corresponding to the determined hue angle in the display color gamut (the second color gamut). The maximum-color saturation brightness value determination unit 105 outputs the maximum-color saturation brightness value 125 to the first color gamut conversion unit 106 and the conversion method selection unit 108.

The color gamut conversion process in which the color gamut of the image data is converted from the input color gamut (the first color gamut) to the display color gamut (the second color gamut) is performed on the input image data 101 by the first color gamut conversion unit 106, the second color gamut conversion unit 107, and the conversion method selection unit 108. In the color gamut conversion process, at least one of a first conversion process in which the pixel value is converted such that the brightness value L* (the L* value) approaches the maximum-color saturation brightness value and a second conversion process in which the pixel value is converted such that the brightness value L* does not change is performed for each hue angle (hue).

The first color gamut conversion unit 106 converts the color gamut of the L*a*b* data 122 from the input color gamut to the display color gamut by performing the above-described first conversion process on the L*a*b* data 122. With this, first conversion data 126 as the L*a*b* data is generated. In the present embodiment, in the first conversion process, the set display color gamut information 123, the set input color gamut information 124, and the maximum-color saturation brightness value 125 are used.

The second color gamut conversion unit 107 converts the color gamut of the L*a*b* data 122 from the input color gamut to the display color gamut by performing the above-described second conversion process on the L*a*b* data 122. With this, second conversion data 127 as the L*a*b* data is generated. In the present embodiment, in the second conversion process, the set display color gamut information 123 and the set input color gamut information 124 are used.

The conversion method selection unit 108 selects one of the first conversion data 126 (the pixel value of the first conversion data 126) and the second conversion data 127 (the pixel value of the second conversion data 127) for each pixel of the input image data 101. In the present embodiment, the first conversion data 126 or the second conversion data 127 is selected based on the pixel value (the L*a*b* color space value) of the L*a*b* data 122 and the maximum-color saturation brightness value 125. Subsequently, the conversion method selection unit 108 outputs the image data (the L*a*b* data) in which each pixel value is the selected pixel value described above to the RGB conversion unit 109 as selection data 128. Note that, in the present embodiment, both of the first conversion process and the second conversion process are performed on one pixel, and one of the result of the first conversion process and the result of the second conversion process is selected. However, only one of the first conversion process and the second conversion process may also be performed such that the selected result is obtained.

The RGB conversion unit 109 generates RGB data 129 having the linear characteristic by converting each pixel value (the L*a*b* color space value) of the selection data 128 into the RGB value. The RGB conversion unit 109 outputs the generated RGB data 129 to the gamma conversion unit 110.

The gamma conversion unit 110 generates gamma conversion data 130 by converting the gradation characteristic of the RGB data 129 into the gradation characteristic corresponding to the display characteristic of the display panel unit 111 (gamma conversion process). The gamma conversion unit 110 outputs the generated gamma conversion data 130 to the display panel unit 111. Note that, in the gamma conversion unit 110, all of the gradation values may or may not be converted with the same conversion characteristic. In the case where display characteristics of a plurality of display elements of the display panel unit 111 are different from each other, it is preferable to use a plurality of different conversion characteristics in the display elements. In general, the display characteristic is dependent on the type of the display element. Accordingly, it is preferable to use the conversion characteristic corresponding to the type of the display element.

The display panel unit 111 is the display unit that displays an image based on the gamma conversion data 130 on a screen. As the display panel unit 111, it is possible to use a liquid crystal display panel, an organic EL display panel, a plasma display panel, or the like.

Next, the process of the image display apparatus 100 will be specifically described. The gradation characteristic conversion unit 103 converts the input image data that has the 10-bit RGB value as the pixel value and has the nonlinear characteristic into the linear characteristic data 121 that has the 14-bit RGB value as the pixel value and has the linear characteristic. In the present embodiment, the input image data 101 is converted into the linear characteristic data 121 by the gamma conversion process that uses the gamma value of 2.2.

The L*a*b* conversion unit 104 generates the L*a*b* data 122 by converting each pixel value (the RGB value) of the linear characteristic data 121 generated in the gradation characteristic conversion unit 103 into the L*a*b* color space value. In the present embodiment, the L*a*b* conversion unit 104 performs the following process on each pixel of the linear characteristic data 121.

First, the L*a*b* conversion unit 104 converts the RGB value of the linear characteristic data 121 into an XYZ tristimulus value based on the input color gamut information 124. In the present embodiment, it is assumed that the input color gamut is the color gamut defined by Rec. 2020. An X value, a Y value, and a Z value included in the XYZ tristimulus value are calculated by using the following Expressions 1 to 3. In Expressions 1 to 3, "X" is the X value, "Y" is the Y value, "Z" is the Z value, "R" is the R value, "G" is the G value, and "B" is the B value.

$$X=0.637 \times R+0.145 \times G+0.169 \times B \quad \text{(Expression 1)}$$

$$Y=0.263 \times R+0.678 \times G+0.059 \times B \quad \text{(Expression 2)}$$

$$Z=0.000 \times R+0.028 \times G+1.061 \times B \quad \text{(Expression 3)}$$

Next, the L*a*b* conversion unit 104 converts the XYZ tristimulus value into the L*a*b* color space value. The L* value, the a* value, and the b* value that are included in the L*a*b* color space value are calculated by using the following Expressions 4 to 6. In Expressions 4 to 6, "L*" is the L* value, "a*" is the a* value, and "b*" is the b* value. "Xn" is the X value of a while point, "Yn" is the Y value of the white point, and "Zn" is the Z value of the white point. A function f(t) is a function in which "$t^{1/3}$" is obtained in the case where $t>(6/29)^3$ is satisfied, and "$(\frac{1}{3}) \times (29/6)^2 \times t + 4/29$" is obtained in the other cases.

$$L^*=116 \times f(Y/Yn)-16 \quad \text{(Expression 4)}$$

$$a^*=500 \times (f(X/Xn)-f(Y/Yn)) \quad \text{(Expression 5)}$$

$$b^*=200 \times (f(Y/Yn)-f(Z/Zn)) \quad \text{(Expression 6)}$$

The maximum-color saturation brightness value determination unit 105 calculates the hue angle from the a* value and the b* value for each pixel of the L*a*b* data 122. The hue angle is calculated by using the following Expression 7. In Expression 7, "a*" is the a* value, and "b*" is the b* value.

$$\text{hue angle}=\tan^{-1}(b^*/a^*) \quad \text{(Expression 7)}$$

Subsequently, the maximum-color saturation brightness value determination unit 105 determines the maximum-color saturation brightness value 125 corresponding to the hue angle for each pixel of the L*a*b* data 122 based on the display color gamut information 123 and the hue angle.

Figure 2:
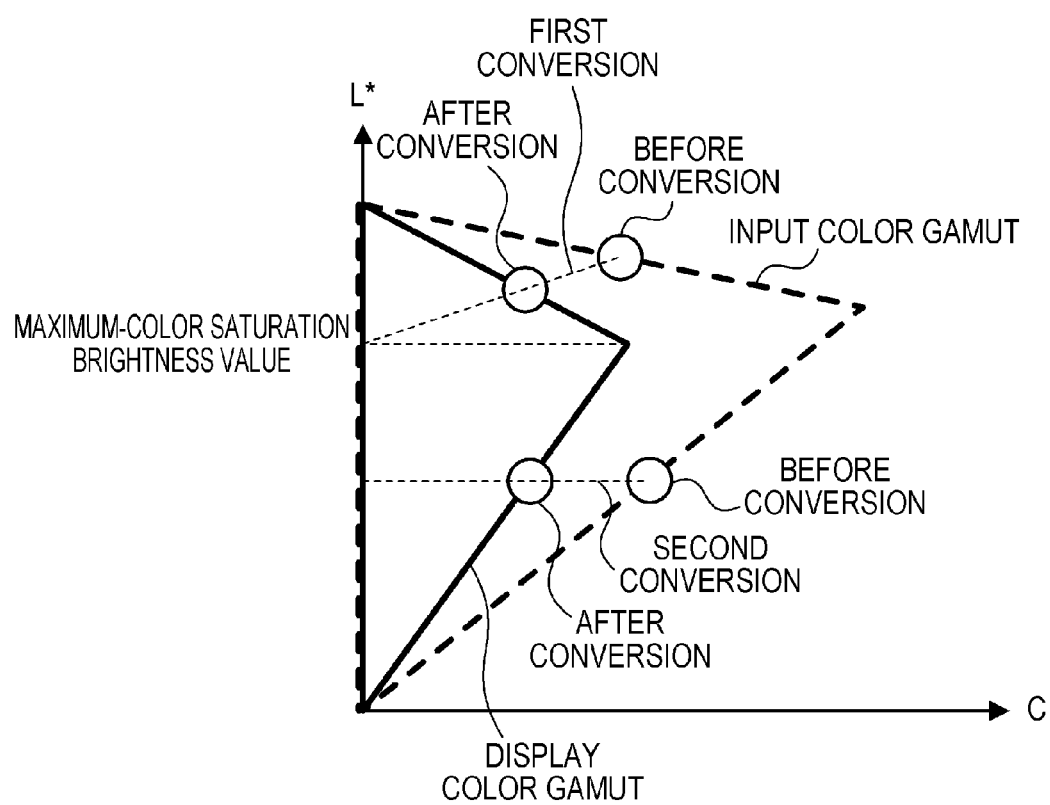
FIG. 2 is a view showing an example of a color gamut conversion process according to Embodiment 1.

An example of the method for determining the maximum-color saturation brightness value 125 will be described by using FIG. 2. The vertical axis in FIG. 2 indicates the brightness value L*, and the horizontal axis in FIG. 2 indicates the color saturation value C. The brightness value L* is the L* value included in the L*a*b* color space value. The color saturation value C is calculated from a distance between the a* value and the b* value included in the L*a*b* color space value. Specifically, the color saturation value C is calculated by using the following Expression 8. FIG. 2 shows the brightness value L* and the color saturation value C corresponding to the hue angle (green hue) of 120 degrees. In FIG. 2, a triangle in a solid line represents the display color gamut. As shown in FIG. 2, the brightness value L* that maximizes the color saturation value C in the display color gamut is determined as the maximum-color saturation brightness value 125.

$$C=(a^{*2}+b^{*2})^{1/2} \quad \text{(Expression 8)}$$

The first color gamut conversion unit 106 converts the color gamut of the L*a*b* data 122 from the input color gamut to the display color gamut by performing the first conversion process on the L*a*b* data 122. With this, the first conversion data 126 as the L*a*b* data is generated.

An example of the first conversion process will be described by using FIG. 2. In FIG. 2, a triangle in a broken line represents the input color gamut (the color gamut defined by Rec. 2020; the color gamut of the L*a*b* data 122). In the present embodiment, the pixel value (the L*a*b* color space value of the L*a*b* data 122) corresponding to coordinates (the brightness value L*, the color saturation value C) outside the display color gamut is converted by the first conversion process. Specifically, as indicated by the broken line in FIG. 2, the conversion that causes the brightness value L* to approach the maximum-color saturation brightness value is performed. In the example in FIG. 2, the pixel value is converted such that the coordinates after the conversion are positioned at the edge of the display color gamut. In addition, in the example in FIG. 2, the pixel value is converted such that the color saturation value C linearly changes with respect to the change of the brightness value L* to the maximum-color saturation brightness value. Accordingly, in the example in FIG. 2, the coordinates (the brightness value L*, the color saturation value C)=(the maximum-color saturation brightness value, 0) are positioned on a straight line passing through the coordinates before the conversion and the coordinates after the conversion. In the first conversion process, the pixel value corresponding to the coordinates inside the display color gamut is not converted.

With this, it is possible to convert the color gamut from the input color gamut to the display color gamut while preventing the change of the brightness value L* and the change (decrease) of the color saturation value C. Note that the coordinates after the conversion may not be positioned at the edge of the display color gamut. In addition, the pixel value may also be converted such that the color saturation value C nonlinearly changes with respect to the change of the brightness value L* to the maximum-color saturation brightness value. Further, the pixel value may also be converted such that the color saturation value C discontinuously changes with respect to the change of the brightness value L* to the maximum-color saturation brightness value.

The second color gamut conversion unit 107 converts the color gamut of the L*a*b* data 122 from the input color gamut to the display color gamut by performing the second conversion process on the L*a*b* data 122. With this, the second conversion data 127 as the L*a*b* data is generated.

An example of the second conversion process will be described by using FIG. 2. In the present embodiment, the pixel value (the L*a*b* color space value of the L*a*b* data 122) corresponding to the coordinates (the brightness value L*, the color saturation value C) outside the display color gamut is converted by the second conversion process. Specifically, as indicated by the broken line in FIG. 2, the conversion that maintains the brightness value L* is performed. In the example in FIG. 2, the pixel value is converted such that the coordinates after the conversion are positioned at the edge of the display color gamut. In the second conversion process, the pixel value corresponding to the coordinates inside the display color gamut is not converted.

With this, it is possible to convert the color gamut from the input color gamut to the display color gamut without changing the brightness value L*. However, in the second conversion process, the change of the color saturation value C is large as compared with that of the first conversion process. Note that the coordinates after the conversion may not be positioned at the edge of the display color gamut.

The conversion method selection unit 108 selects the first conversion data 126 or the second conversion data 127 for each pixel of the input image data 101 based on the brightness value L* (the L* value) of the L*a*b* data 122 and the maximum-color saturation brightness value 125. Subsequently, the conversion method selection unit 108 outputs the image data (the L*a*b* data) in which each pixel value is the selected pixel value described above to the RGB conversion unit 109 as the selection data 128.

Specifically, the conversion method selection unit 108 performs the process for selecting the first conversion data 126 or the second conversion data 127 in accordance with the following Expression 9 for each pixel of the input image data 101.

the case where the brightness value L*>the maximum-color saturation brightness value is satisfied: the first conversion data is selected the case where the brightness value L*≤the maximum-color saturation brightness value is satisfied: the second conversion data is selected (Expression 9)

With this, the pixel value of the input image data 101 having the brightness value L* larger than the maximum-color saturation brightness value 125 is converted by the first conversion process. In addition, the pixel value of the input image data 101 having the brightness value L* equal to or smaller than the maximum-color saturation brightness value 125 is converted by the second conversion process. As a result, it is possible to prevent decreases of the color saturation and contrast caused by converting the color gamut of the image data. Specifically, with regard to a light portion (an image area in which the brightness value L* is large), it is possible to prevent the change of the brightness value L* and the decrease of the color saturation value C. With regard to a dark portion (an image area in which the brightness value L* is small), it is possible to maintain the brightness value L*, and prevent the occurrence of black floating.

The RGB conversion unit 109 generates the RGB data 129 having the linear characteristic by converting each pixel value (the L*a*b* color space value) of the selection data 128 into the RGB value. In the RGB conversion unit 109, the inversion of the conversion performed in the L*a*b* conversion unit 104 is performed. With this, the selection data 128 is converted into the RGB data 129. Specifically, the L*a*b* color space value is converted into the XYZ tristimulus value by using Expressions 4 to 6. Subsequently, the XYZ tristimulus value is converted into the RGB value by using expressions corresponding to Expressions 1 to 3. In the L*a*b* conversion unit 104, a coefficient based on the input color gamut is used as the coefficient of the RGB value. On the other hand, in the RGB conversion unit 109, a coefficient based on the display color gamut is used as the coefficient of the XYZ tristimulus value. Accordingly, herein, the description "by using expressions corresponding to Expressions 1 to 3" is used instead of the description "by using Expressions 1 to 3". These two conversions are performed on each pixel of the selection data 128.

The gamma conversion unit 110 generates the gamma conversion data 130 by converting the gradation characteristic of the RGB data 129 into the gradation characteristic corresponding to the display characteristic of the display panel unit 111. In the present embodiment, gamma curve information 144 is set by the control unit 102. The gamma curve information 144 is a parameter (a function, a table, or the like) indicative of the correspondence between the gradation value before the conversion by the gamma conversion unit 110 and the gradation value after the conversion by the gamma conversion unit 110. The gamma conversion unit 110 generates the gamma conversion data 130 by converting each gradation value of the RGB data 129 in accordance with the set gamma curve information 144. In the present embodiment, the RGB data 129 is converted into the gamma conversion data 130 by the gamma conversion process that uses the gamma value of 1/2.2.

Figure 13:
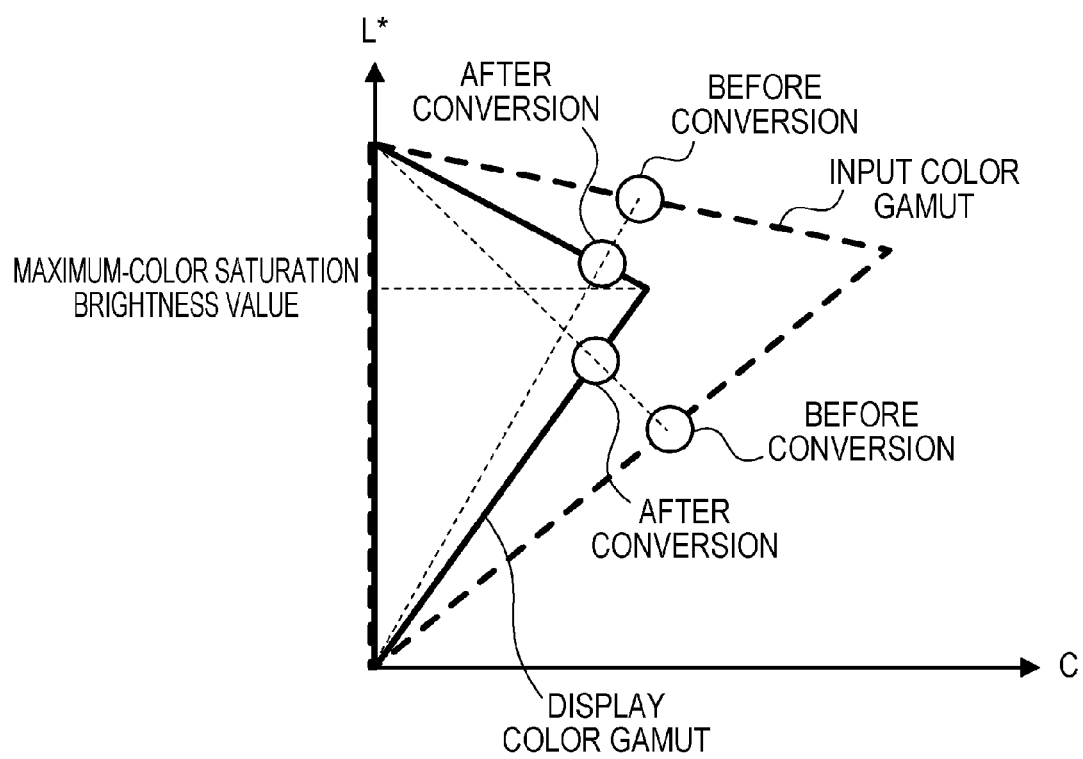
FIG. 13 is a view showing an example of the color gamut conversion process.

For comparison, a description will be given of the case where the pixel value of the input image data having the brightness value L* smaller than the maximum-color saturation brightness value is converted such that the brightness value L* increases. In a comparative example, it is assumed that the pixel value having the brightness value L* larger than the maximum-color saturation brightness value is converted such that the brightness value L* approaches 0, and the pixel value of the input image data having the brightness value L* smaller than the maximum-color saturation brightness value is converted such that the brightness value L* approaches the upper limit value. FIG. 13 is a schematic view showing the state of the conversion of the color gamut in the comparative example. The vertical axis in FIG. 13 indicates the brightness value L*, and the horizontal axis in FIG. 13 indicates the color saturation value C.

In the comparative example, the pixel value having the brightness value L* larger than the maximum-color saturation brightness value is converted such that the brightness value L* decreases, and the pixel value having the brightness value L* smaller than the maximum-color saturation brightness value is converted such that the brightness value L* increases. Accordingly, in an area of the input image data in which the brightness value L* is smaller than a predetermined value, the brightness value increases in the image data after the conversion, and the area is displayed brightly. In other words, in the comparative example, there are cases where the black floating occurs. Consequently, in the case where the color gamut is converted as shown in FIG. 13, a difference of the brightness value of the pixel value after the conversion is reduced, and hence the contrast decreases.

According to the present embodiment, the pixel value of the input image data having the brightness value larger than the maximum-color saturation brightness value is converted by the first conversion process, and the pixel value of the input image data having the brightness value equal to or smaller than the maximum-color saturation brightness value is converted by the second conversion process. Consequently, the brightness value after the conversion of the pixel value of the input image data having the brightness value equal to or smaller than the maximum-color saturation brightness value does not change from the level of the input image data, and it becomes possible to prevent a dark area in the input image data from being displayed brightly. With this, it is possible to prevent the decreases of the color saturation and the contrast caused by converting the color gamut of the image data. Note that the case where the brightness value and the color saturation value are determined from the L*a*b* color space value has been described in the present embodiment, but the method for determining the brightness value and the color saturation value is not limited thereto. For example, the RGB value may be converted into an L*u*v* color space value or a YUV color space value, and the brightness value and the color saturation value may also be determined from the L*u*v* color space value, the YUV color space value or the like.

Embodiment 2

Hereinbelow, the image processing apparatus according to Embodiment 2 of the present invention will be described. In the present embodiment, the method of the color gamut conversion process is different from that in Embodiment 1.

In the following description, the configuration and process different from those in Embodiment 1 will be described in detail, and the description of the same configuration and process as those in Embodiment 1 will be omitted.

In the color gamut conversion process in Embodiment 1, the first conversion process is always performed on the light portion. As a result, the brightness value L* of the light portion having a hue of which the maximum-color saturation brightness value 125 is small significantly decreases. The significant decrease of the brightness value L* causes the decrease of the contrast. In addition, in the color gamut conversion process in Embodiment 1, the second conversion process is always performed on the dark portion. As a result, the chrome value C of the dark portion having the hue of which the maximum-color saturation brightness value 125 is small significantly decreases.

Figure 5:
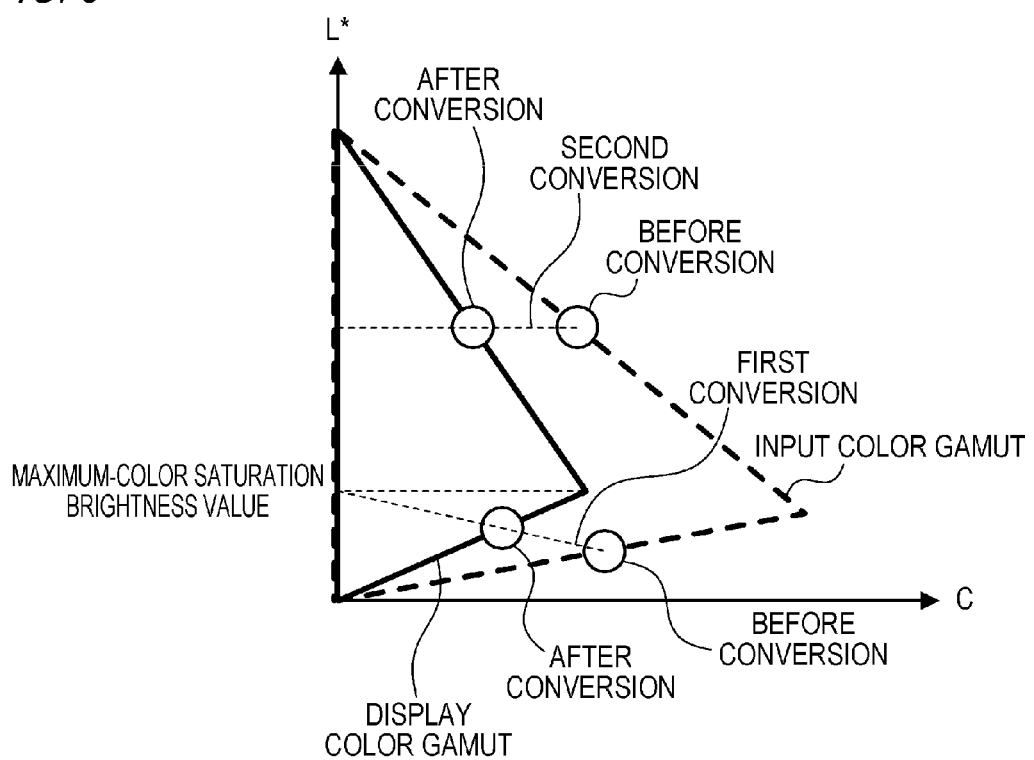
FIG. 5 is a view showing an example of the color gamut conversion process according to Embodiment 2.

To cope with this, in the present embodiment, with regard to the hue having the small maximum-color saturation brightness value 125, as shown in FIG. 5, the second conversion process is performed on the light portion, and the first conversion process is performed on the dark portion. With this, it is possible to prevent the decrease of the brightness value L* of the light portion having the hue of which the maximum-color saturation brightness value 125 is small, and prevent the decrease of the color saturation value C of the dark portion having the hue of which the maximum-color saturation brightness value 125 is small.

Figure 3:
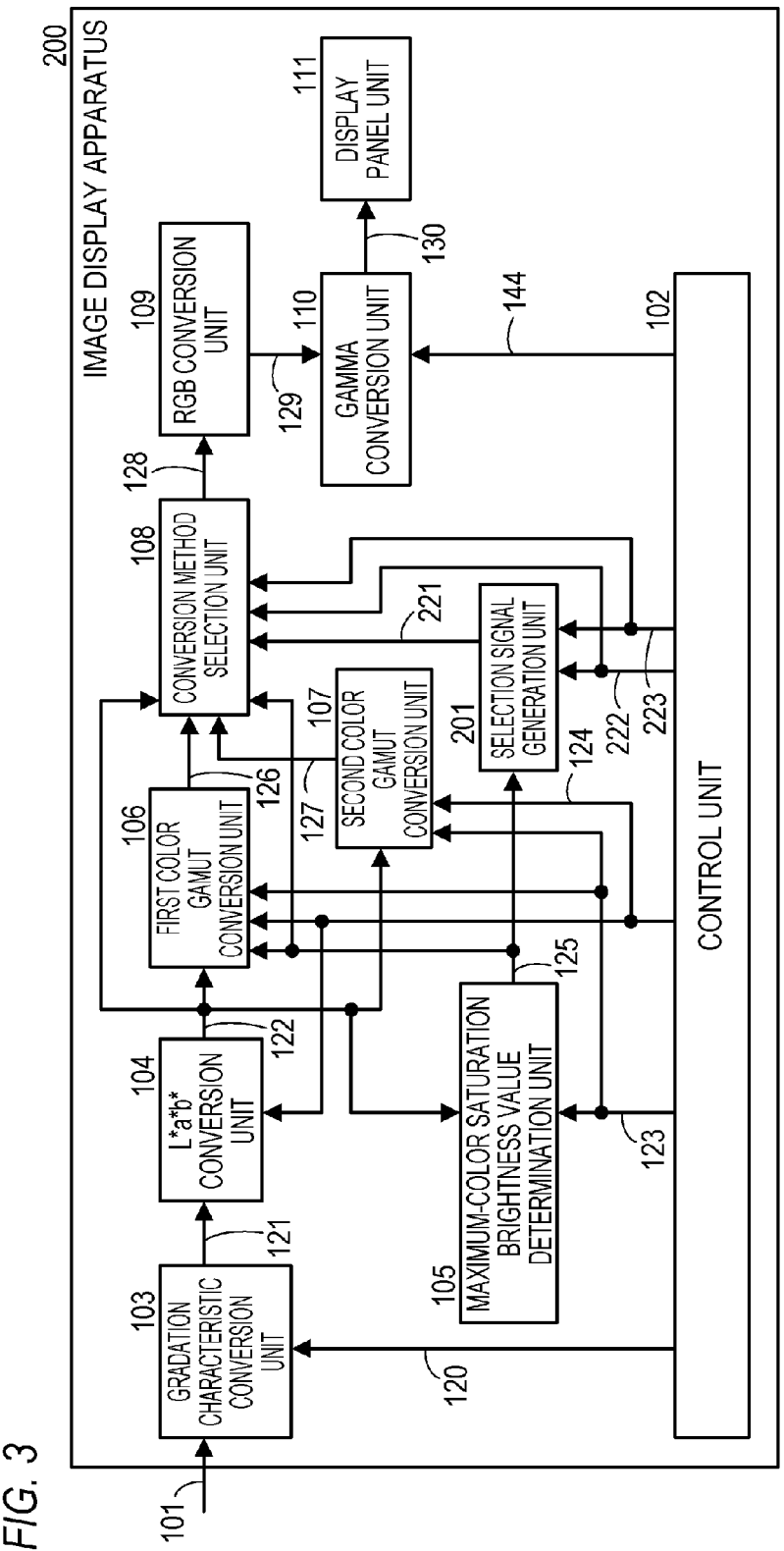
FIG. 3 is a block diagram showing an example of the functional configuration of the image display apparatus according to Embodiment 2.

FIG. 3 is a block diagram showing an example of the functional configuration of an image display apparatus 200 according to the present embodiment. As shown in FIG. 3, the image display apparatus 200 has a plurality of the function units of the image display apparatus 100 in Embodiment 1 and a selection signal generation unit 201.

In the present embodiment, a light-portion threshold value (first threshold value) 222 and a dark-portion threshold value (second threshold value) 223 are further set by the control unit 102. The dark-portion threshold value 223 is the value less than the light-portion threshold value 222 (less than the first threshold value). The light-portion threshold value 222 and the dark-portion threshold value 223 may be fixed values predetermined by a maker or may also be values that can be changed by a user. The light-portion threshold value 222 and the dark-portion threshold value 223 may be automatically determined in accordance with the type of the input image data 101 and the use environment of the image display apparatus 200 (ambient brightness or the like).

The selection signal generation unit 201 generates a selection signal 221 for each pixel of the input image data 101. The selection signal 221 is generated based on the maximum-color saturation brightness value 125, the light-portion threshold value 222, and the dark-portion threshold value 223. Specifically, the selection signal 221 is generated by using the following Expression 10. For example, "0" is generated as the selection signal 221 for the pixel having a green hue. "2" is generated as the selection signal 221 for the pixel having a blue hue, and "1" is generated as the selection signal 221 for the pixel having a red hue. The selection signal generation unit 201 outputs the selection signal 221 of each pixel to the conversion method selection unit 108.

The case where the maximum-color saturation brightness value>the light-portion threshold value is satisfied: the selection signal=0 is generated The case where the maximum-color saturation brightness value<the dark-portion threshold value is satisfied: the selection signal=2 is generated The other cases: the selection signal=1 is generated (Expression 10)

The conversion method selection unit 108 selects at least one of the first conversion data 126 and the second conversion data 127 for each pixel of the input image data 101. In the present embodiment, at least one of the first conversion data 126 and the second conversion data 127 is selected based on the brightness value L* of the L*a*b* data 122, the maximum-color saturation brightness value 125, and the selection signal 221. Subsequently, the conversion method selection unit 108 determines the pixel value of the selection data 128 based on the selected pixel value, and outputs the selection data 128. In the case where the conversion method selection unit 108 has selected one of the pixel value of the first conversion data 126 and the pixel value of the second conversion data 127, the selected pixel value is determined as the pixel value of the selection data 128. In addition, in the case where the conversion method selection unit 108 has selected both of the pixel value of the first conversion data 126 and the pixel value of the second conversion data 127, a combined value obtained by weighting and combining the selected two pixel values is calculated, and the calculated combined value is determined as the pixel value of the selection data 128.

Specifically, the process shown in FIG. 4 is performed. In the case where the selection signal 221=0 is satisfied, the maximum-color saturation brightness value 125 is large, and hence the conversion method selection unit 108 performs the same color gamut conversion process (FIG. 2) as that in Embodiment 1. In the case where the selection signal 221=2 is satisfied, the maximum-color saturation brightness value 125 is small, and hence the conversion method selection unit 108 performs the color gamut conversion process shown in FIG. 5. That is, the process for selecting the first conversion data 126 or the second conversion data 127 is performed in accordance with the following Expression 11.

The case where the brightness value $L^*>$the maximum-color saturation brightness value is satisfied: the second conversion data is selected The case where the brightness value $L^*\leq$the maximum-color saturation brightness value is satisfied: the first conversion data is selected (Expression 11)

In the case where the selection signal 221=1 is satisfied, the maximum-color saturation brightness value 125 has an intermediate value, and hence the conversion method selection unit 108 selects both of the first conversion data 126 and the second conversion data 127, and performs the weighting and combining of the first conversion data 126 and the second conversion data 127. As the weighting and combining, the weighting and combining of the L* value, the weighting and combining of the a* value, and the weighting and combining of the b* value are performed. In the present embodiment, the weighting and combining of the first conversion data 126 and the second conversion data 127 is performed by using the following Expression 12. In Expression 12, "Comb" is the combined value obtained by the weighting and combining, and "α" is a weight. As the weight α, a value of not less than 0 and not more than 1 is used.

The case where the brightness value L*>the maximum-color saturation brightness value is satisfied:

Comb=α×the first conversion data+(1−α)×the second conversion data

The case where the brightness value L*≤the maximum-color saturation brightness value is satisfied:

Comb=(1−α)×the first conversion data+α×the second conversion data (Expression 12)

In addition, in the present embodiment, the weight α is calculated by using the following Expression 13.

α=(the maximum-color saturation brightness value−the dark-portion threshold value)/(the light-portion threshold value−the dark-portion threshold value)   (Expression 13)

According to the above-described method, the pixel value of the input image data corresponding to the hue having the maximum-color saturation brightness value larger than the first threshold value and having the brightness value larger than the maximum-color saturation brightness value is converted by the first conversion process. The pixel value of the input image data corresponding to the hue having the maximum-color saturation brightness value larger than the first threshold value and having the brightness value equal to or smaller than the maximum-color saturation brightness value is converted by the second conversion process. The pixel value of the input image data corresponding to the hue having the maximum-color saturation brightness value smaller than the second threshold value and having the brightness value larger than the maximum-color saturation brightness value is converted by the second conversion process. The pixel value of the input image data corresponding to the hue having the maximum-color saturation brightness value smaller than the second threshold value and having the brightness value equal to or smaller than the maximum-color saturation brightness value is converted by the first conversion process.

Further, the pixel value of the input image data corresponding to the hue having the maximum-color saturation brightness value of not more than the first threshold value and not less than the second threshold value is converted into the combined value obtained by performing the weighting and combining of the pixel value after the conversion by the first conversion process and the pixel value after the conversion by the second conversion process. Specifically, in the case where the pixel value of the input image data has the brightness value larger than the maximum-color saturation brightness value, the pixel value of the input image data is converted into a first combined value. In the case where the pixel value of the input image data has the brightness value equal to or smaller than the maximum-color saturation brightness value, the pixel value of the input image data is converted into a second combined value. The first combined value is the combined value that is closer to the pixel value after the conversion by the second conversion process as the maximum-color saturation brightness value is closer to the second threshold value, and is closer to the pixel value after the conversion by the first conversion process as the maximum-color saturation brightness value is farther away from the second threshold value. The second combined value is the combined value that is closer to the pixel value after the conversion by the first conversion process as the maximum-color saturation brightness value is closer to the second threshold value, and is closer to the pixel value after the conversion by the second conversion process as the maximum-color saturation brightness value is farther away from the second threshold value.

As described thus far, according to the present embodiment, the color gamut conversion process in which the magnitude of the maximum-color saturation brightness value is further considered is performed. With this, it is possible to further prevent the decreases of the color saturation and the contrast caused by converting the color gamut of the image data.

Embodiment 3

Hereinbelow, the image processing apparatus according to Embodiment 3 of the present invention will be described.

In the present embodiment, the method of the color gamut conversion process is different from those in Embodiments 1 and 2. In the following description, the configuration and process different from those in Embodiment 2 will be described in detail, and the description of the same configuration and process as those in Embodiment 2 will be omitted.

In the present embodiment, in the color gamut conversion process, an exceptional process corresponding to the brightness value L*, a display brightness (the brightness of the screen), or the like is performed. Specifically, in the case where the display brightness is high, visual recognition of brightness change becomes insensitive, and hence the first conversion process is performed irrespective of the maximum-color saturation brightness value 125 and the magnitude relationship between the maximum-color saturation brightness value 125 and the brightness value L*. With this, it is possible to further prevent the decrease of the color saturation value C in an image area in which the visual recognition of the brightness change is insensitive. On the other hand, in the case where the display brightness is low, the visual recognition of the brightness change becomes sensitive, and hence the second conversion process is performed irrespective of the maximum-color saturation brightness value 125 and the magnitude relationship between the maximum-color saturation brightness value 125 and the brightness value L*. With this, it is possible to convert the color gamut without changing the brightness value L* in an image area in which the visual recognition of the brightness change is sensitive.

Figure 6:
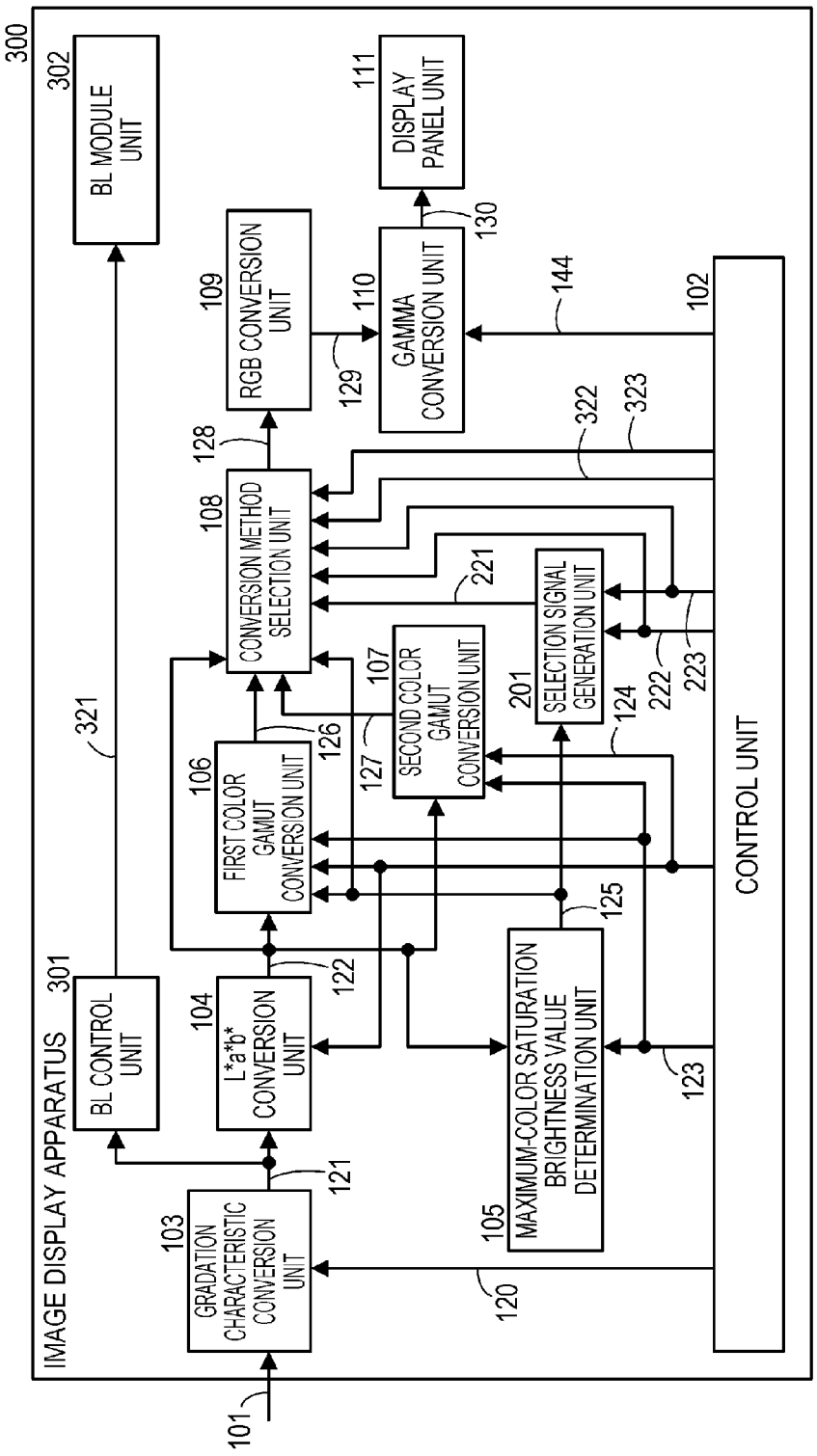
FIG. 6 is a block diagram showing an example of the functional configuration of the image display apparatus according to Embodiment 3.

FIG. 6 is a block diagram showing an example of the functional configuration of an image display apparatus 300 according to the present embodiment. As shown in FIG. 6, the image display apparatus 300 has a plurality of the function units of the image display apparatus 200 in Embodiment 2, a BL control unit 301, and a BL module unit 302.

Figure 7:
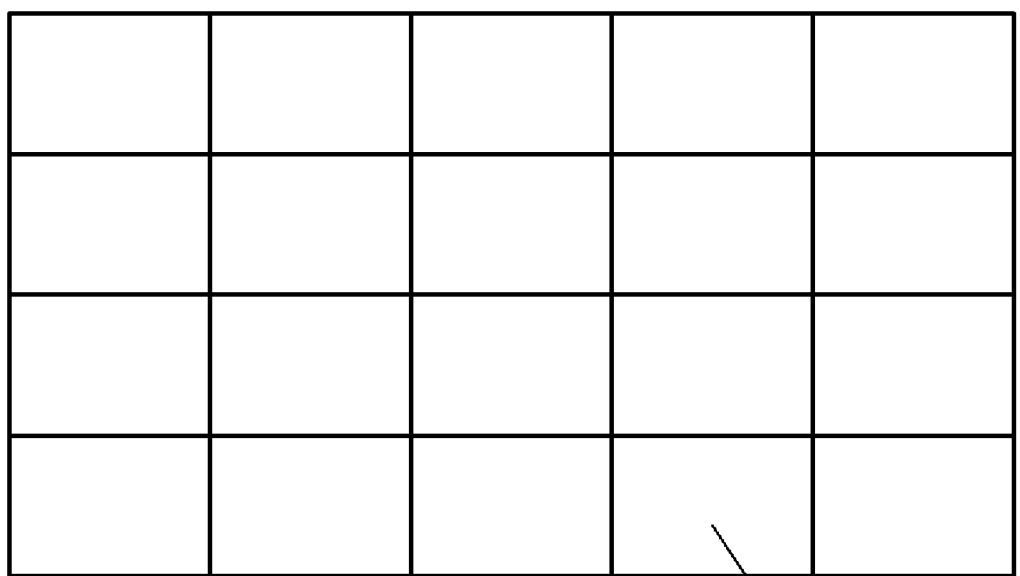
FIG. 7 is a view showing an example of the configuration of a BL module unit according to Embodiment 3.

The BL module unit 302 is a light-emitting unit that irradiates the back surface of the display panel unit 111 with light. In the present embodiment, as shown in FIG. 7, the BL module unit 302 has a plurality of light-emitting areas corresponding to a plurality of divided areas that constitute the area of the screen. The light emission brightnesses of the light-emitting areas can be individually controlled. One or more light sources are provided in the light-emitting areas. As the light source, it is possible to use a light-emitting diode (LED), an organic EL element, a cold-cathode tube, or the like. Note that the configuration of the BL module unit 302 is not particularly limited. FIG. 7 shows 20 light-emitting areas arranged in 4 rows and 5 columns, but the number of light-emitting areas and the arrangement thereof are not particularly limited. Similarly, the number of divided areas and the arrangement thereof are not particularly limited. For example, a plurality of the light-emitting areas may be arranged in a staggered pattern. A plurality of the BL module units 302 may have one light-emitting area corresponding to the entire area of the screen.

The display panel unit 111 displays the image on the screen by modulating light emitted from the BL module unit 302. As the display panel unit 111 that modulates light emitted from the BL module unit 302, it is possible to use, e.g., a liquid crystal panel. Note that, in the case where a light-emitting display panel is used as the display panel unit 111, the BL control unit 301 and the BL module unit 302 are not required.

The BL control unit 301 controls the light emission brightness of the BL module unit 302. In the present embodiment, the BL control unit 301 generates BL control data 321 from the linear characteristic data 121, and outputs the BL control data 321 to the BL module unit 302. The BL module unit 302 emits light at the light emission brightness corresponding to the BL control data 321.

Figure 8:
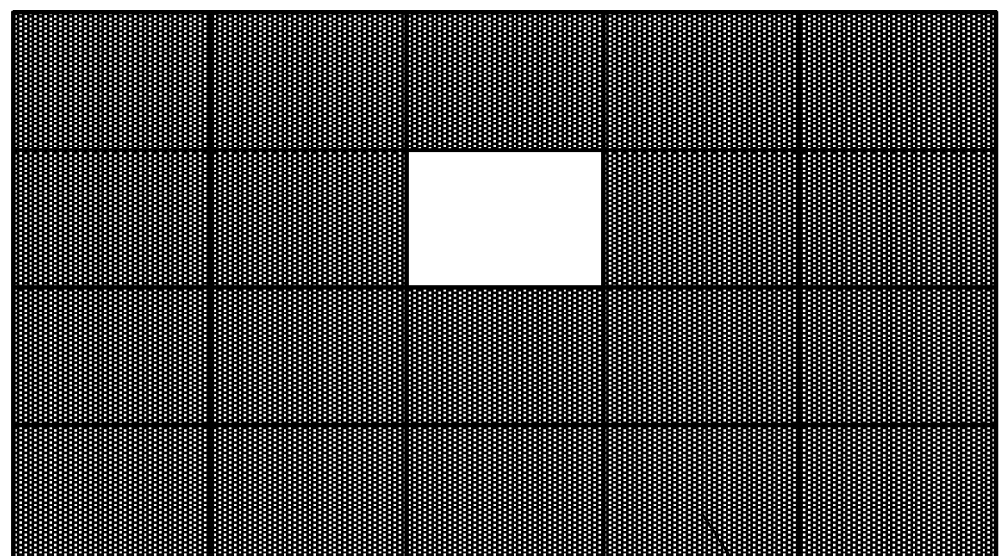
FIG. 8 is a view showing an example of a light-emitting state of the BL module unit according to Embodiment 3.

In the present embodiment, the BL control data 321 that individually controls the light emission brightnesses of a plurality of the light-emitting areas is generated. Specifically, the BL control unit 301 calculates, for each of the divided areas, the average brightness value of the linear characteristic data 121 corresponding to the divided area. Subsequently, the BL control unit 301 determines, for each of the light-emitting areas, a value corresponding to the average brightness value corresponding to the light-emitting area as the value of the BL control data 321 corresponding to the light-emitting area. As a result, in the case where a light object is present in an image and an area other than the area of the object is dark, the light emission brightness of the light-emitting area corresponding to the divided area in which the object is present is controlled to be high, and the light emission brightness of the remaining light-emitting area is controlled to be low. For example, as shown in FIG. 8, the light emission brightness of each light-emitting area is controlled. FIG. 8 shows an example in the case where the light object is present at the center of the image and the areas other than the area of the object are dark. In the example in FIG. 8, the light-emitting area in the second row and the third column is turned on, and the remaining light-emitting areas are turned off. With such control, it is possible to increase the contrast of the display image (the image displayed on the screen) to many times the contrast of the display panel unit 111.

Note that the control method of the light emission brightness of the BL module unit 302 is not limited to the above-described method. For example, a brightness characteristic value other than the average brightness value may also be used. Specifically, the maximum value, the minimum value, the mode, the intermediate value, and the histogram of the brightness value may also be used. The light emission brightnesses of all of the light-emitting areas may also be controlled to the same brightness.

In the present embodiment, a high-brightness threshold value (first brightness) 322 and a low-brightness threshold value (second brightness) 323 are further set by the control unit 102. The low-brightness threshold value 323 is the value less than the high-brightness threshold value 322. The high-brightness threshold value 322 and the low-brightness threshold value 323 may be fixed values predetermined by the maker or may also be values that can be changed by the user. The high-brightness threshold value 322 and the low-brightness threshold value 323 may be automatically determined in accordance with the type of the input image data 101 and the use environment of the image display apparatus 300 (the ambient brightness or the like).

Figure 9:
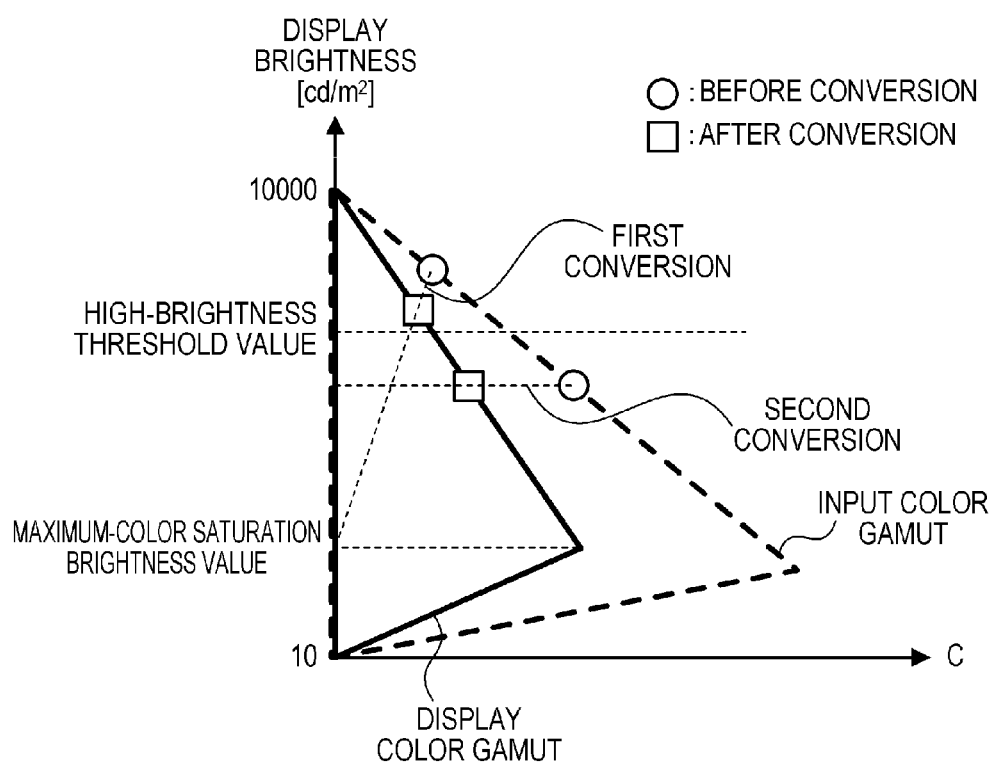
FIG. 9 is a view showing an example of an exceptional process according to Embodiment 3.

The conversion method selection unit 108 performs the same process as that in Embodiment 2. However, the conversion method selection unit 108 performs the exceptional process in accordance with the high-brightness threshold value 322, the low-brightness threshold value 323, and the brightness value L*. The exceptional process according to the present embodiment will be described by using FIGS. 9 and 10. FIGS. 9 and 10 show an example in which the selection signal 221=2 is satisfied.

FIG. 9 shows the exceptional process to the pixel of the divided area corresponding to the light-emitting area that is turned on. In the example in FIG. 9, the maximum value of the brightness value L* in the input color gamut corresponds to the display brightness of 10000 cd/m², and the minimum value of the brightness value L* in the input color gamut corresponds to the display brightness of 10 cd/m². The conversion method selection unit 108 estimates the display brightness in the case where the image based on the input image data 101 is displayed on the screen. The display brightness can be estimated from the input image data 101 (the brightness value L*) and the display characteristic of the display panel unit 111. However, in the case where the display that uses the light-emitting unit (the BL module unit 302) is performed, the display brightness is dependent on the light emission brightness of the light-emitting unit. Accordingly, in the present embodiment, the display brightness is estimated in consideration of the light emission brightness of the BL module unit 302. Specifically, the conversion method selection unit 108 estimates the display brightness based on the brightness value L*, the BL control data 321, and the display characteristic of the display panel unit 111. A detection value of a sensor that detects light from the BL module unit 302 may be used instead of the BL control data 321.

In Embodiment 2, in the case where the selection signal 221=2 is satisfied and the brightness value L*>the maximum-color saturation brightness value 125 is satisfied, the second conversion process that does not change the brightness value L* is performed. However, as described above, in the case where the display brightness is high, the visual recognition of the brightness change becomes insensitive. As a result, even when the brightness value L* has changed to a certain degree, no problem is presented. Accordingly, in the present embodiment, as shown in FIG. 9, in the case where the estimated display brightness is higher than the high-brightness threshold value 322, the first conversion process is performed as the exceptional process. Specifically, in the case where the estimated display brightness is higher than the high-brightness threshold value 322, the conversion method selection unit 108 selects the first conversion data 126 irrespective of the maximum-color saturation brightness value 125 and the magnitude relationship between the maximum-color saturation brightness value 125 and the brightness value L*. The high-brightness threshold value 322 is not particularly limited and, in the present embodiment, 1000 cd/m² is used as the high-brightness threshold value 322.

FIG. 10 shows the exceptional process to the pixel of the divided area corresponding to the light-emitting area that is turned off. In the example in FIG. 10, the maximum value of the brightness value L* in the input color gamut corresponds to the display brightness of 100 cd/m², and the minimum value of the brightness value L* in the input color gamut corresponds to the display brightness of 0.1 cd/m².

In Embodiment 2, in the case where the selection signal 221=2 is satisfied and the brightness value L*≤the maximum-color saturation brightness value 125 is satisfied, the first conversion process that causes the brightness value L* to approach the maximum-color saturation brightness value 125 is performed. However, as described above, in the case where the display brightness is low, the visual recognition of the brightness change becomes sensitive. As a result, there is a possibility that the user perceives the slight change of the brightness value L*. To cope with this, in the present embodiment, as shown in FIG. 10, in the case where the estimated display brightness is lower than the low-brightness threshold value 323, the second conversion process is performed as the exceptional process. Specifically, in the case where the estimated display brightness is lower than the low-brightness threshold value 323, the conversion method selection unit 108 selects the second conversion data 127 irrespective of the maximum-color saturation brightness value 125 and the magnitude relationship between the maximum-color saturation brightness value 125 and the brightness value L*. The low-brightness threshold value 323 is not particularly limited and, in the present embodiment, 1 cd/m² is used as the low-brightness threshold value 323.

FIG. 11 shows the color gamut conversion process according to the present embodiment. From FIG. 11, it can be seen that the same process as that in Embodiment 2 is performed in the case where the selection signal 221=0 is satisfied. In the other cases, the process different from that in Embodiment 2 is sometimes performed with the above-described exceptional process. Note that one of the exceptional process described by using FIG. 9 and the exceptional process described by using FIG. 10 may be omitted.

As described thus far, according to the present embodiment, the color gamut conversion process in which the relationship between the display brightness and the visual recognition of the brightness change is further considered is performed. With this, it is possible to obtain the image data more suitable for the visual characteristic of the user as the image data after the color gamut conversion process.

Note that the color gamut conversion process in which the relationship between the display brightness and the visual recognition of the brightness change is further considered is not limited to the above-described process. For example, the brightness value L* may be compared with a threshold value without estimating the display brightness. Specifically, in the case where the brightness value is larger than a third threshold value, the first conversion process may be performed irrespective of the maximum-color saturation brightness value and the magnitude relationship between the maximum-color saturation brightness value and the brightness value. In the case where the brightness value is smaller than a fourth threshold value, the second conversion process may be performed irrespective of the maximum-color saturation brightness value and the magnitude relationship between the maximum-color saturation brightness value and the brightness value. The fourth threshold value is the value less than the third threshold value. The third threshold value and the fourth threshold value may be fixed values predetermined by the maker or may also be values that can be changed by the user. The third threshold value and the fourth threshold value may be automatically determined in accordance with the type of the input image data and the use environment of the image display apparatus (the ambient brightness or the like). The third threshold value may be automatically adjusted so as to correspond to the first brightness, and the fourth threshold value may be automatically adjusted so as to correspond to the second brightness.

In general, light emitted from the light-emitting unit (the BL module unit) diffuses and attenuates. In the case where such diffusion or attenuation is not considered, there are cases where the brightness having a difference from the actual display brightness that is too large to be ignored is estimated as the display brightness. In the case where the brightness having the difference from the actual display brightness that is too large to be ignored is estimated, it is not possible to implement the color gamut conversion process suitable for the visual characteristic of the user. Accordingly, it is preferable to estimate the display brightness in consideration of the brightness distribution of light emitted from the light-emitting unit (the distribution in which the diffusion or the attenuation is considered). With this, it is possible to estimate the display brightness with higher accuracy, and implement the color gamut conversion process suitable for the visual characteristic of the user more reliably. As the method for determining the brightness distribution of light emitted from the light-emitting unit, various proposed conventional arts can be used.

Figure 12:
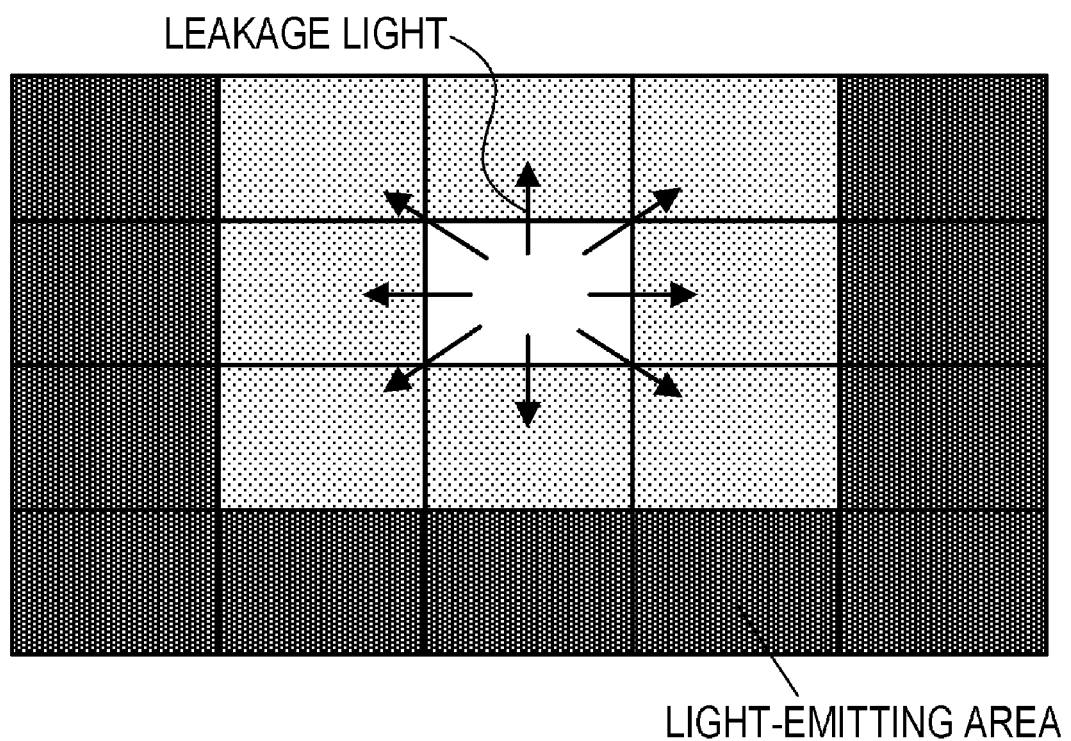
FIG. 12 is a view showing an example of the light-emitting state of the BL module unit according to Embodiment 3.

In addition, as shown in FIG. 12, there are cases where light emitted from the light-emitting area leaks to surrounding divided areas. In the case where such light leakage is not considered, there are cases where the brightness that is too low to be ignored as compared with the actual display brightness is estimated. In the case where the brightness that is too low to be ignored as compared with the actual display brightness is estimated, it is not possible to implement the color gamut conversion process suitable for the visual characteristic of the user. To cope with this, it is preferable to estimate the display brightness in consideration of the light leakage between a plurality of the divided areas (the leakage of light emitted from the light-emitting area). With this, it is possible to estimate the display brightness with higher accuracy, and implement the color gamut conversion process suitable for the visual characteristic of the user more reliably. As the method for determining the degree of leakage of light emitted from the light-emitting area, various proposed conventional arts can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to readout and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-164844, filed on Aug. 24, 2015, which is hereby incorporated by reference herein in its entirety.

What is claimed is:

1. An image processing apparatus comprising:
one or more processor; and
one or more memory storing a program which, when executed by the one or more processor, causes the image processing apparatus to:
acquire first image data represented by a color included in a first color gamut; and
convert colors of pixels of the first image data into colors included in a second color gamut by changing at least color saturation to thereby generate second image data represented by colors included in the second color gamut,
wherein the one or more processor converts the color of the pixel of the first image data by at least one of a first conversion process in which the color is converted such that a brightness of the color after the conversion approaches a target brightness and a second conversion process in which the color is converted such that the brightness does not change,
wherein the one or more processor converts the color of the pixel, a brightness of which is included in a first brightness range, of the first image data by the first conversion process, and converts the color of the pixel, a brightness of which is included in a second brightness range different from the first brightness range, of the first image data by the second conversion process,
wherein first brightness range is a range having a brightness higher than a predetermined brightness,
wherein the second brightness range is a range having a brightness equal to or lower than the predetermined brightness,
wherein the predetermined brightness is a specific brightness that maximizes color saturation of the second color gamut in a hue in which the color of the pixel of the first image data that is converted by the one or more processor is included, and
wherein the one or more processor converts the color of the pixel of the first image data by using the color after the conversion by the first conversion process and the color after the conversion by the second conversion process in a case where the specific brightness is equal to or lower than a first threshold value and equal to or higher than a second threshold value which is lower than the first threshold.

2. An image processing method comprising:
an acquisition step of acquiring first image data represented by a color included in a first color gamut; and
a conversion step of converting colors of pixels of the first image data into colors included in a second color gamut by changing at least color saturation to thereby generate second image data represented by colors included in the second color gamut,
wherein in the conversion step, the color of the pixel of the first image data is converted by at least one of a first conversion process in which the color is converted such that a brightness of the color after the conversion approaches a target brightness and a second conversion process in which the color is converted such that the brightness does not change,
wherein in the conversion step, the color of the pixel, a brightness of which is included in a first brightness range, of the first image data is converted by the first conversion process, and the color of the pixel, a brightness of which is included in a second brightness range different from the first brightness range, of the first image data is converted by the second conversion process,
wherein the first brightness range is a range having a brightness higher than a predetermined brightness,
wherein the second brightness range is a range having a brightness equal to or lower than the predetermined brightness,
wherein the predetermined brightness is a specific brightness that maximizes color saturation of the second color gamut in a hue in which the color of the pixel of the first image data that is converted in the conversion step is included, and
wherein in the conversion step, the color of the pixel of the first image data is converted by using the color after the conversion by the first conversion process and the color after the conversion by the second conversion process in a case where the specific brightness is equal to or lower than a first threshold value and equal to or higher than a second threshold value which is lower than the first threshold.

3. An image processing apparatus comprising:
one or more processor; and
one or more memory storing a program which, when executed by the one or more processor, causes the image processing apparatus to:
acquire first image data represented by a color included in a first color gamut; and
convert colors of pixels of the first image data into colors included in a second color gamut by changing at least color saturation to thereby generate second image data represented by colors included in the second color gamut,
wherein the one or more processor converts the color of the pixel of the first image data by at least one of a first conversion process in which the color is converted such that a brightness of the color after the conversion approaches a target brightness and a second conversion process in which the color is converted such that the brightness does not change,
wherein the one or more processor converts the color of the pixel, a brightness of which is included in a first brightness range, of the first image data by the first conversion process, and converts the color of the pixel, a brightness of which is included in a second brightness range different from the first brightness range, of the first image data by the second conversion process,
wherein the first brightness range is a range having a brightness higher than a predetermined brightness,
wherein the second brightness range is a range having a brightness equal to or lower than the predetermine brightness, and
wherein the predetermined brightness is a brightness set by a user.

4. The image processing apparatus according to claim 3 wherein
the target brightness is a specific brightness, which is a brightness that maximizes color saturation of the second color gamut, in a hue in which the color of the pixel of the first image data that is converted by the one or more processor is included.

5. The image processing apparatus according to claim 3 wherein
the predetermined brightness is the target brightness.

6. The image processing apparatus according to claim 3 wherein
the one or more processor converts the color of the pixel of the first image data such that a hue including the color of the pixel of the first image data is identical with a hue including the color of a pixel of the second image data obtained by converting the color of the pixel of the first image data.

7. The image processing apparatus according to claim 3 wherein
the one or more processor converts the color of the pixel of the first image data such that the color saturation linearly changes with respect to a change of the brightness between the color of the pixel of the first image data and the color of a pixel of the second image data obtained by converting the color of the pixel of the first image data in the first conversion process.

8. An image processing method comprising:
an acquisition step of acquiring first image data represented by a color included in a first color gamut; and
a conversion step of converting colors of pixels of the first image data into colors included in a second color gamut by changing at least color saturation to thereby generate second image data represented by colors included in the second color gamut,
wherein in the conversion step, the color of the pixel of the first image data is converted by at least one of a first conversion process in which the color is converted such that a brightness of the color after the conversion approaches a target brightness and a second conversion process in which the color is converted such that the brightness does not change,
wherein in the conversion step, the color of the pixel, a brightness of which is included in a first brightness range, of the first image data is converted by the first conversion process, and the color of the pixel, a brightness of which is included in a second brightness range different from the first brightness range, of the first image data is converted by the second conversion process,
wherein the first brightness range is a range having a brightness higher than a predetermined brightness,
wherein the second brightness range is a range having a brightness equal to or lower than the predetermined brightness, and
wherein the predetermined brightness is a brightness set by a user.

9. An image display apparatus comprising:
an display module having a panel to displaying an image;
one or more processor; and
one or more memory storing a program which, when executed by the one or more processor, causes the image display apparatus to;
acquire first image data represented by a color included in a first color gamut;
convert colors of pixels of the first image data into colors included in a second color gamut by changing at least color saturation to thereby generate second image data represented by colors included in the second color gamut; and
control the display module displaying the image based on the second image data,
wherein the one or more processor converts the color of the pixel of the first image data by at least one of a first conversion process in which the color is converted such that a brightness of the color after the conversion approaches a target brightness and a second conversion process in which the color is converted such that the brightness does not change, and
wherein the one or more processor converts the color of the pixel, a brightness of which is included in a first brightness range, of the first image data by the first conversion process, and converts the color of the pixel, a brightness of which is included in a second brightness range different from the first brightness range, of the first image data by the second conversion process.

10. The image display apparatus according to claim 9 wherein
the target brightness is a specific brightness, which is a brightness that maximizes color saturation of the second color gamut, in a hue in which the color of the pixel of the first image data that is converted by the one or more processor is included.

11. The image display apparatus according to claim 9 wherein
the first brightness range is a range having a brightness higher than a predetermined brightness, and
the second brightness range is a range having a brightness equal to or lower than the predetermined brightness.

12. The image display apparatus according to claim 11 wherein
the predetermined brightness is the target brightness.

13. The image display apparatus according to claim 11 wherein
the predetermined brightness is a specific brightness that maximizes color saturation of the second color gamut in a hue in which the color of the pixel of the first image data that is converted by the one or more processor is included.

14. The image display apparatus according to claim 13 wherein
the one or more processor
converts the color of the pixel of the first image data by the first conversion process in a case where the specific brightness is higher than a first threshold value and the brightness of the color of the first image data that is converted by the one or more processor is higher than the specific brightness, and
converts the color of the pixel of the first image data by the second conversion process in a case where the specific brightness is higher than the first threshold value and the brightness of the color of the pixel of the first image data that is converted by the one or more processor is equal to or lower than the specific brightness.

15. The image display apparatus according to claim 13 wherein
the one or more processor
converts the color of the pixel of the first image data by the second conversion process in a case where the specific brightness is lower than a second threshold value and the brightness of the color of the pixel of the first image data that is converted by the one or more processor is higher than the specific brightness, and
converts the color of the pixel of the first image data by the first conversion process in a case where the specific brightness is lower than the second threshold value and the brightness of the color of the pixel of the first image data that is converted by the one or more processor is equal to or lower than the specific brightness.

16. The image display apparatus according to claim 15 wherein
the one or more processor converts the color of the pixel, a brightness of which is higher than a third threshold value, which is higher than the second threshold value, of the first image data by the first conversion process.

17. The image display apparatus according to claim 15 wherein
the one or more processor converts the color of the pixel, a brightness of which is lower than a fourth threshold value, which is lower than the second threshold value, of the first image data by the second conversion process.

18. The image display apparatus according to claim 15, wherein
the program, when executed by the one or more processor, further causes the image display apparatus
to estimate a brightness of a screen in a case where an image based on the first image data is displayed on the screen of the display module on the basis of the first image data and a display characteristic of the display module, and
wherein the one or more processor converts the color of the pixel, an estimated brightness of which is higher than a first brightness, of the first image data by the first conversion process.

19. The image display apparatus according to claim 18 wherein
the display module displays the image on the screen by modulating light emitted from a light-emitting module, and
the one or more processor estimates the brightness of the screen by using a light emission brightness of the light-emitting module.

20. The image display apparatus according to claim 19 wherein
the light-emitting module has a plurality of light-emitting areas corresponding to a plurality of divided areas constituting an area of the screen, and
the one or more processor estimates the brightness of the screen in consideration of leakage of the light emitted from the light-emitting areas between the divided areas.

21. The image display apparatus according to claim 15, wherein
the program, when executed by the one or more processor, further causes the image display apparatus
to estimate a brightness of a screen in a case where an image based on the first image data is displayed on the screen of the display module on the basis of the first image data and a display characteristic of the display module, and
wherein the one or more processor converts the color of the pixel, an estimated brightness of which is lower than a second brightness, of the first image data by the second conversion process.

22. The image display apparatus according to claim 13 wherein
the one or more processor converts the color of the pixel of the first image data by using the color after the conversion by the first conversion process and the color after the conversion by the second conversion process in a case where the specific brightness is equal to or lower than a first threshold value and equal to or higher than a second threshold value which is lower than the first threshold.

23. The image display apparatus according to claim 22 wherein
in the case where the specific brightness is equal to or lower than the first threshold value and equal to or higher than the second threshold value,
the one or more processor converts the color of the pixel, a brightness of which is higher than the specific brightness, of the first image data into a color closer to the color after the conversion by the second conversion process as the specific brightness is closer to the second threshold value, and into a color closer to the color after the conversion by the first conversion process as the specific brightness is farther away from the second threshold value, and
the one or more processor converts the color of the pixel, a brightness of which is equal to or lower than the specific brightness, of the first image data into a color closer to the color after the conversion by the first conversion process as the specific brightness is closer to the second threshold value, and into a color closer to the color after the conversion by the second conversion process as the specific brightness is farther away from the second threshold value.

24. The image display apparatus according to claim 11 wherein
the predetermined brightness is a brightness set by a user.

25. The image display apparatus according to claim 9 wherein
the one or more processor converts the color of the pixel of the first image data such that a hue including the color of the pixel of the first image data is identical with a hue including the color of a pixel of the second image data obtained by converting the color of the pixel of the first image data.

26. The image display apparatus according to claim 9 wherein
the one or more processor converts the color of the pixel of the first image data such that the color saturation linearly changes with respect to a change of the brightness between the color of the pixel of the first image data and the color of a pixel of the second image data obtained by converting the color of the pixel of the first image data in the first conversion process.

27. The image display apparatus according to claim 9 wherein the display module is a liquid crystal display module.

28. The image display apparatus according to claim 9 wherein the display module is an organic EL display module.

29. The image display apparatus according to claim 9 wherein
the first color gamut is a color gamut defined by Rec. 2020, and
the second color gamut is a color gamut defined by Rec. 709.

30. A control method for controlling an image display apparatus,
the image display apparatus comprising an display module having a panel to displaying an image, and
the control method comprising:
an acquisition step of acquiring first image data represented by a color included in a first color gamut;
a conversion step of converting colors of pixels of the first image data into colors included in a second color gamut by changing at least color saturation to thereby generate second image data represented by colors included in the second color gamut; and
a control step of controlling the display module displaying the image based on the second image data,
wherein in the conversion step, the color of the pixel of the first image data is converted by at least one of a first conversion process in which the color is converted such that a brightness of the color after the conversion approaches a target brightness and a second conversion process in which the color is converted such that the brightness does not change, and wherein in the conversion step, the color of the pixel, a brightness of which is included in a first brightness range, of the first image data is converted by the first conversion process, and the color of the pixel, a brightness of which is included in a second brightness range different from the first brightness range, of the first image data is converted by the second conversion process.

* * * * *